United States Patent [19]

Kayanuma

[11] Patent Number: 5,663,760
[45] Date of Patent: Sep. 2, 1997

[54] IMAGE PICKUP DEVICE SHIELDING APPARATUS FOR ELECTRONIC STILL CAMERA

[75] Inventor: Yasunobu Kayanuma, Asaka, Japan

[73] Assignee: Fuji Photo Film Co., Ltd., Kanagawa, Japan

[21] Appl. No.: 437,672

[22] Filed: May 9, 1995

[30] Foreign Application Priority Data

May 26, 1994  [JP]  Japan ................................. 6-112570

[51] Int. Cl.⁶ ............................................. H04N 5/217
[52] U.S. Cl. ........................................ 348/241; 348/207
[58] Field of Search ........................ 348/207, 220, 348/221, 241, 243, 248, 251, 296, 294, 297, 311, 335, 340, 362, 363, 367, 368; 354/226, 228, 250, 255, 261; 396/257; H04N 5/217

[56] References Cited

U.S. PATENT DOCUMENTS

| | | | |
|---|---|---|---|
| 4,535,363 | 8/1985 | Harada et al. | 348/219 |
| 4,879,529 | 11/1989 | Ernest | 348/367 |
| 4,903,284 | 2/1990 | Esser | 377/62 |
| 5,293,542 | 3/1994 | Ise et al. | 354/228 |
| 5,376,967 | 12/1994 | Sakota et al. | 348/311 |

*Primary Examiner*—Thai Tran
*Assistant Examiner*—Tuan V. Ho
*Attorney, Agent, or Firm*—Sughrue, Mion, Zinn, Macpeak & Seas

[57] ABSTRACT

An optical image formed by a lens system is incident to a CCD, and the CCD performs an electronic shutter operation. The CCD transfers the generated charges by a domino read method. After the electronic shutter operation, a motor is operated to move a shield plate from the lower side to the upper side to enter into an optical path to block the incidence of light to the CCD. On the surface of the CCD, charge transfer is made first, and shielding of light is made successively, from the horizontal charge transfer passage side. With the image pickup device shielding apparatus, the incidence of light can be positively prevented by a simple mechanism during charge transfer in a solid state image pickup device to improve the quality of the image.

9 Claims, 10 Drawing Sheets

IMAGE PICKUP DEVICE SHIELDING APPARATUS FOR ELECTRONIC STILL CAMERA

FIELD OF THE INVENTION

This invention relates to an image pickup device shielding apparatus for an electronic still camera, designed for positively preventing degradation of an image during charge transfer.

BACKGROUND OF THE INVENTION

In an electronic still camera 1 as shown in FIG. 10, an optical image formed by a lens 2 is incident to a solid state image pickup device (CCD: charge coupled device, or the like) 3, and the solid state image pickup device 3 optoelectrically converts the optical image to produce a charge image. The charge image is read over time, and then processed by a signal processing circuit to form a video image, which is recorded on a memory card 4.

Time setting (exposure time setting) of the electronic still camera is generally achieved by an electronic shutter action of the solid state image pickup device 3. The electronic shutter operation is for adjusting the storing time of the charge signal in the solid state image pickup device 3. More specifically, the CCD, for example, includes an optoelectric conversion unit (photodiode), a gate for reading electrical charges from the optoelectric conversion unit, and a charge transfer passage for transferring the read electrical charge. The electronic shutter operation can be carried out by adjusting a time interval from the time when light is incident to the optoelectric conversion unit to the time when the charge is read.

Some types of electronic still cameras include a mechanical shutter mechanism of the same type as a mechanical shutter used in optical cameras using silver halide films. However, most types use the above electronic shutter operation.

In order to achieve high image quality, some still video cameras include a multi-picture element CCD, which is frame driven and read by a domino method (described later). In this case, when light is incident to the CCD during transfer of the charge through the charge transfer passage, deterioration in image quality such as smears or white flaws are caused by the incident light. This phenomenon becomes conspicuous particularly when the charge during the transfer time exceeds 1V (vertical scanning time). In general, the charge transfer time becomes longer as the number of picture elements increases. Further, when light is incident to the CCD during the time when the charge is stationary (held) in the charge transfer passage, deterioration of image quality is small compared to the case where light is incident during charge transfer.

To prevent such deterioration in image quality, a shield plate has been used which is closed to block light from the lens to the CCD after the shutter operation. Such conventional methods include the following two types.

(1) After the charge is read from the optoelectric conversion unit to the charge transfer passage by the electronic shutter operation, the charge is once held within the charge transfer passage. The shield plate is closed during the holding and, after shielding is completed, charge transfer is begun.

(2) The shield plate is completely closed before the charge read from the optoelectric conversion unit to the charge transfer passage by the electronic shutter operation is begun to be transferred, that is, the shield plate is closed at a high speed in a short time (e.g. 0.6 msec).

However, in the conventional method (1) described above, since all of the charge is held until shielding is completed, the image quality tends to be deteriorated by a dark current.

Further, in the conventional method (2), since the shield plate must be closed at a high speed, a complex and expensive shield mechanism is required.

A primary object of the present invention is to provide an image pickup device shielding apparatus for an electronic still camera which provides a sufficient shielding effect with a simple shield mechanism while maintaining a good image quality.

SUMMARY OF THE INVENTION

In accordance with the present invention, which attains the above object, there is provided an image pickup device shielding apparatus for an electronic still camera wherein an optical image formed by a lens system is incident to a solid state image pickup device, the solid state image pickup device is operated by an electronic shutter and, in the solid state image pickup device, a generated electrical charge is transferred by a domino read method, characterized by comprising:

a shield plate disposed in the vicinity of the front face of the solid state image pickup device for entering into an optical path from a horizontal charge transfer passage of the solid state image pickup device; and a drive mechanism for driving the shield plate into the optical path after an electronic shutter operation.

There is also provided according to the present invention an image pickup device shielding apparatus for an electronic still camera wherein an optical image formed by a lens system is incident to a solid state image pickup device, the solid state image pickup device is operated by an electronic shutter and, in the solid state image pickup device, a generated electrical charge is transferred by a domino read method, characterized by comprising:

a shield plate disposed in the lens system for entering into an optical path from the opposite side of a horizontal charge transfer passage of the solid state image pickup device; and a drive mechanism for driving the shield plate into the optical path after an electronic shutter operation.

In the present invention, light incident to the solid state image pickup device for charge transferring by the domino read method is shielded from the horizontal charge transfer passage side of the solid state image pickup device by entering the shield plate after the operation of the electronic shutter. Therefore, most of charges read to and held in the charge transfer passage are blocked by the shield plate immediately before beginning the transfer, and will never be applied during transfer. The image quality is deteriorated when light is incident during the time when the charge is being transferred, but is not deteriorated if light is incident during holding. Therefore, deterioration of image quality does not occur if the charge is transferred under shielding of light.

DETAILED DESCRIPTION OF PREFERRED EMBODIMENTS

The present invention will now be described in detail with reference to the drawings.

Figure 1:
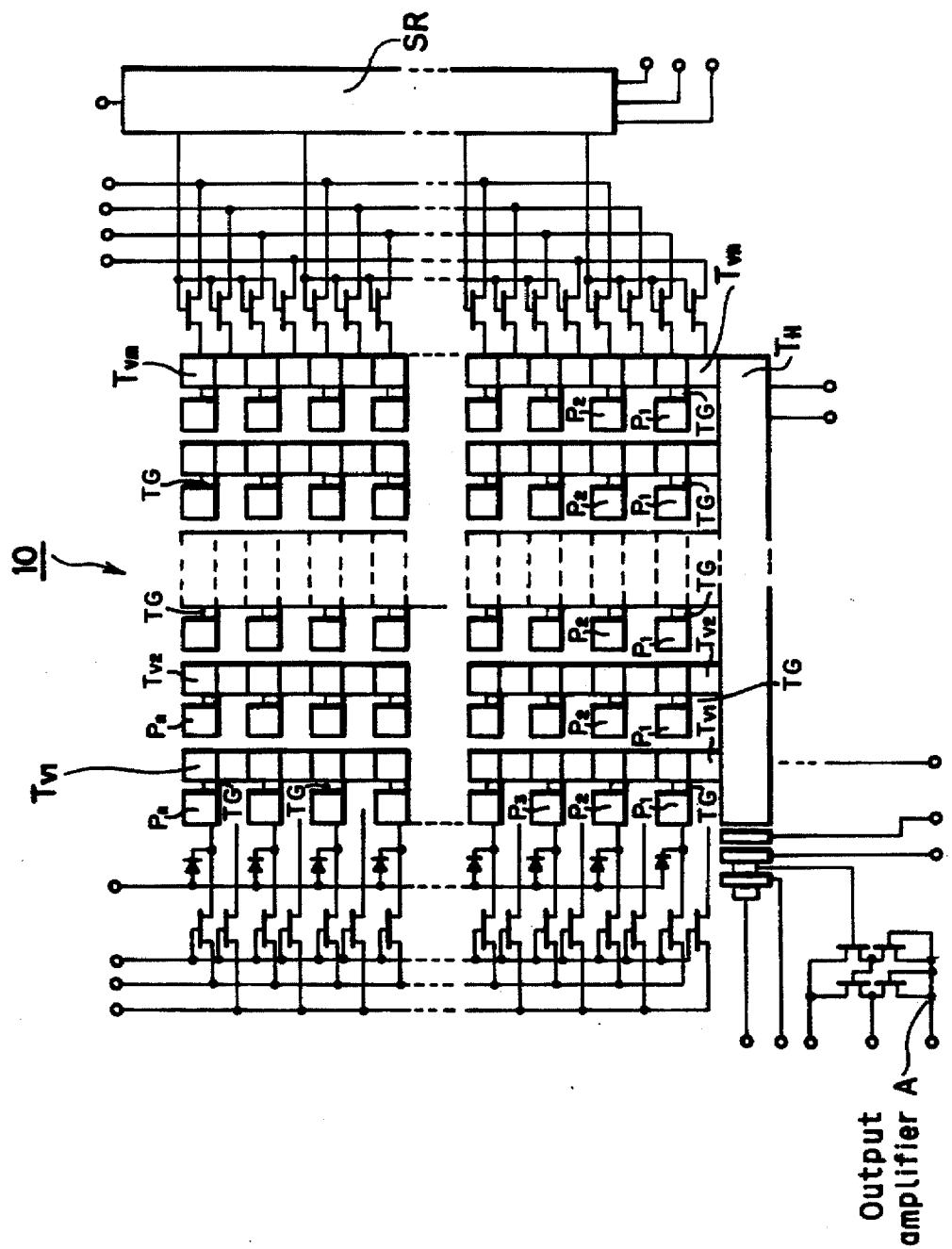
FIG. 1 is a schematic view showing the construction of a CCD used in an embodiment of the present invention.

First, the structure of the CCD used in the electronic still camera of the present embodiment and the domino read method will be described. As shown in FIG. 1, a CCD 10 used in the present embodiment mainly comprises photodiodes $P_1, P_2, P_3 \ldots P_n$ (a similar line uses a similar number) arranged in n lines and m rows for optical conversion, trigger gates TG . . . TG connected to the individual photodiodes $P_1 \ldots P_n$ for reading charge signals, vertical charge transfer passages $T_{v1} \ldots T_{vn}$ in m rows, a horizontal charge transfer passage $T_H$, a shift register SR, and an output amplifier A.

Figure 2:
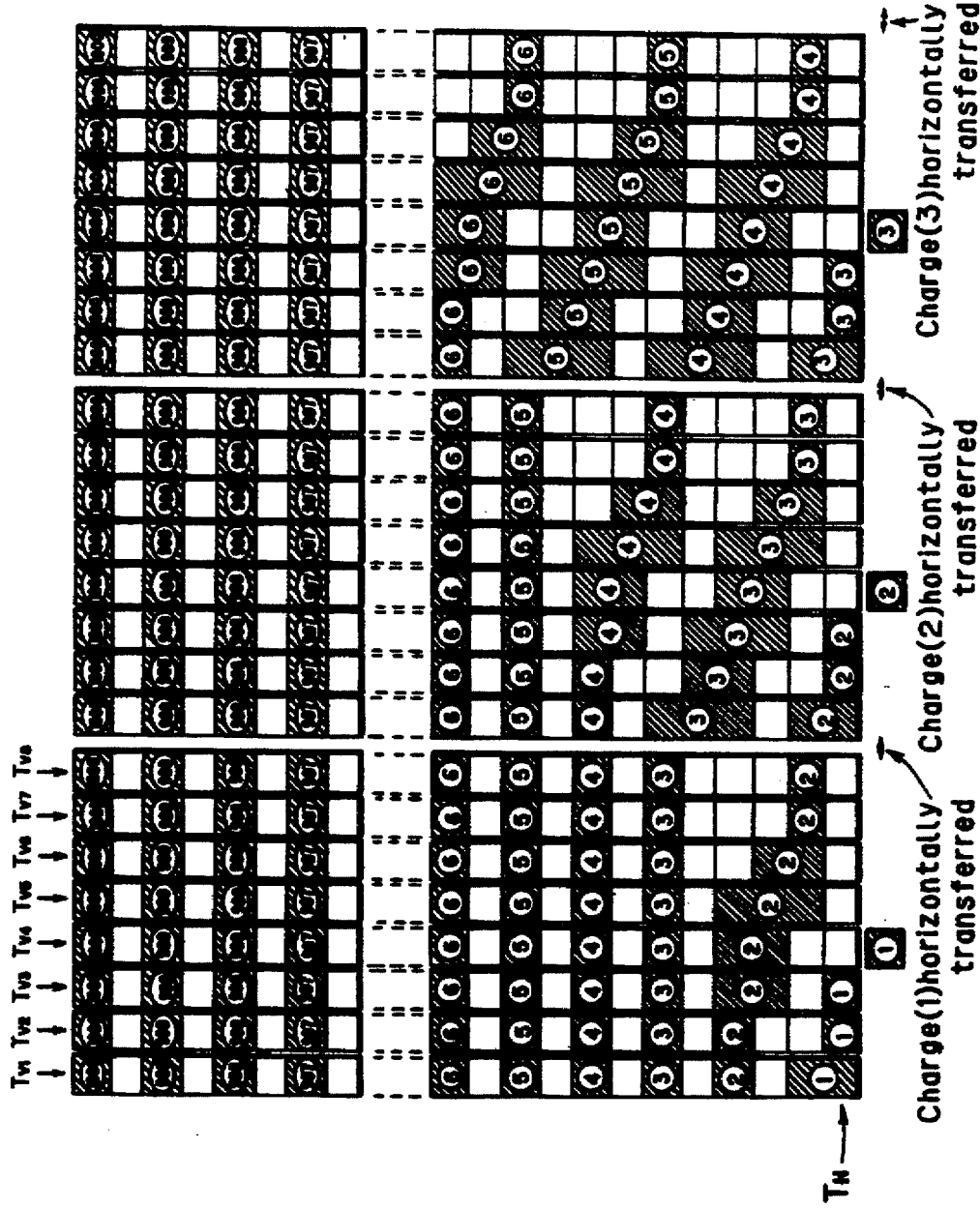
FIG. 2 is a schematic view for explaining the domino read method.

A condition of charge transfer by the domino read method of the CCD 10 of the above construction will be described with reference to FIG. 2. FIG. 2 shows the vertical charge transfer passages $T_{v1}$ to $T_{v8}$ of row 1 to row 8 and the horizontal charge transfer passage $T_H$. Charges generated by the photodiodes $P_1 \ldots P_8$ and read to the charge transfer passages have the individual line numbers in circles. For example, charges read from the individual first line photodiodes $P_1 \ldots P_1$ are indicated by (1) . . . (1).

As shown in FIG. 2(a), when the charge (1) generated in the first line photodiode $P_1$ is horizontally transferred, the charge (2) generated in the second lien photodiode $P_2$ is vertically transferred. However, the charge (3) and subsequent charges remain held in the vertical charge transfer passage $T_v$.

As shown in FIG. 2(b), when the charge (2) is horizontally transferred, the charges (3) and (4) are vertically transferred. However, the charge (5) and subsequent charges are held. As shown in FIG. 2(c), when the charge (3) is horizontally transferred, the charges (4), (5) and (6) are vertically transferred, and the charge (7) and subsequent charges are held.

As described above, in charge transfer by he domino read method, charges in the individual lines are held in the vertical charge transfer passages $T_v$ until charges before that line by predetermined lines are transferred.

Figure 3:
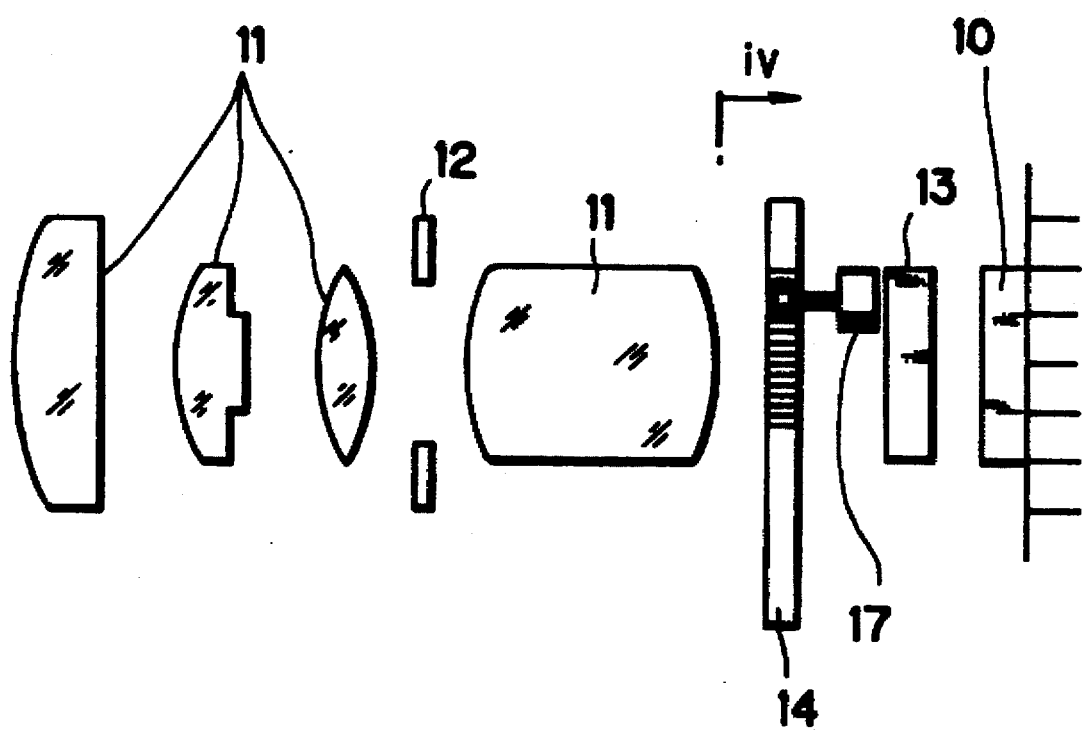
FIG. 3 is a schematic view showing the construction of a first embodiment of the present invention.
Figure 4:
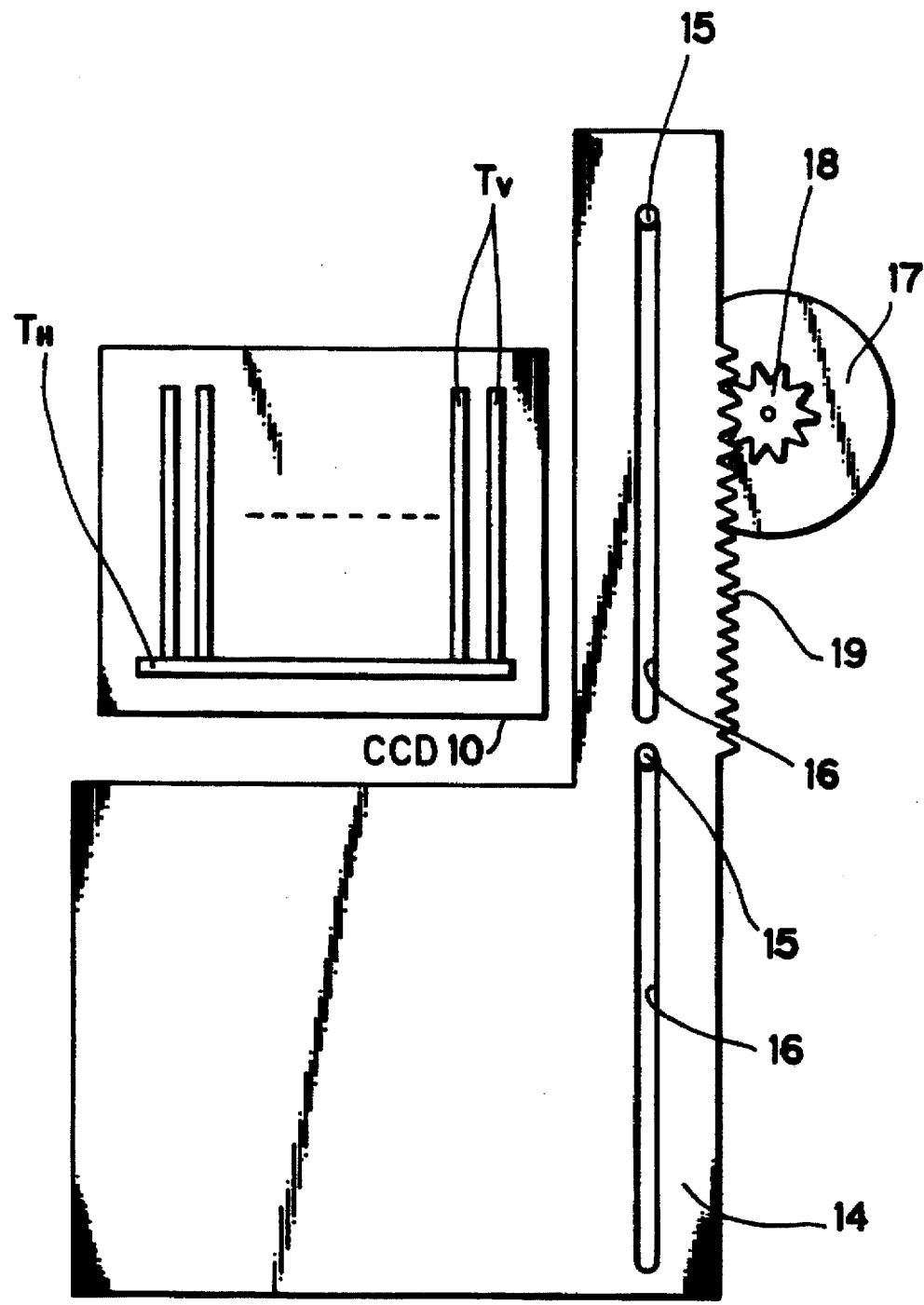
FIG. 4 is a schematic view showing the structure viewed in the direction of line iv—iv in FIG. 3.

FIG. 3 shows the optical system of an electronic still camera to which the first embodiment of the present invention is applied, and FIG. 4 shows a schematic cross sectional view taken along line iv—iv in FIG. 3. As shown in FIGS. 3 and 4, an optical image formed by a lens system 11 and stopped by iris 12 is incident to the CCD through an optical filter 13. The optical image incident to the CCD 10 is reversed upside down by the function of the lens system 11. The CCD 10 has a structure as shown in FIG. 1, which makes charge transfer by the domino read method shown in FIG. 2 possible.

The first embodiment uses a shield plate 14 which can be entered into and withdrawn from the vicinity of the front face of the CCD 10 and, when entered, blocks the optical path. The shield plate 14 can be moved in the vertical direction while guide pins 15 engage guide grooves 16, and the shield plate 14 is vertically moved by transmitting the rotational force of a motor 17 through a pinion 18 and a rack 19. The shield plate 14, before the electronic shutter operation, is located at a lower position out of the optical path as shown in FIGS. 3 and 4.

Figure 5:
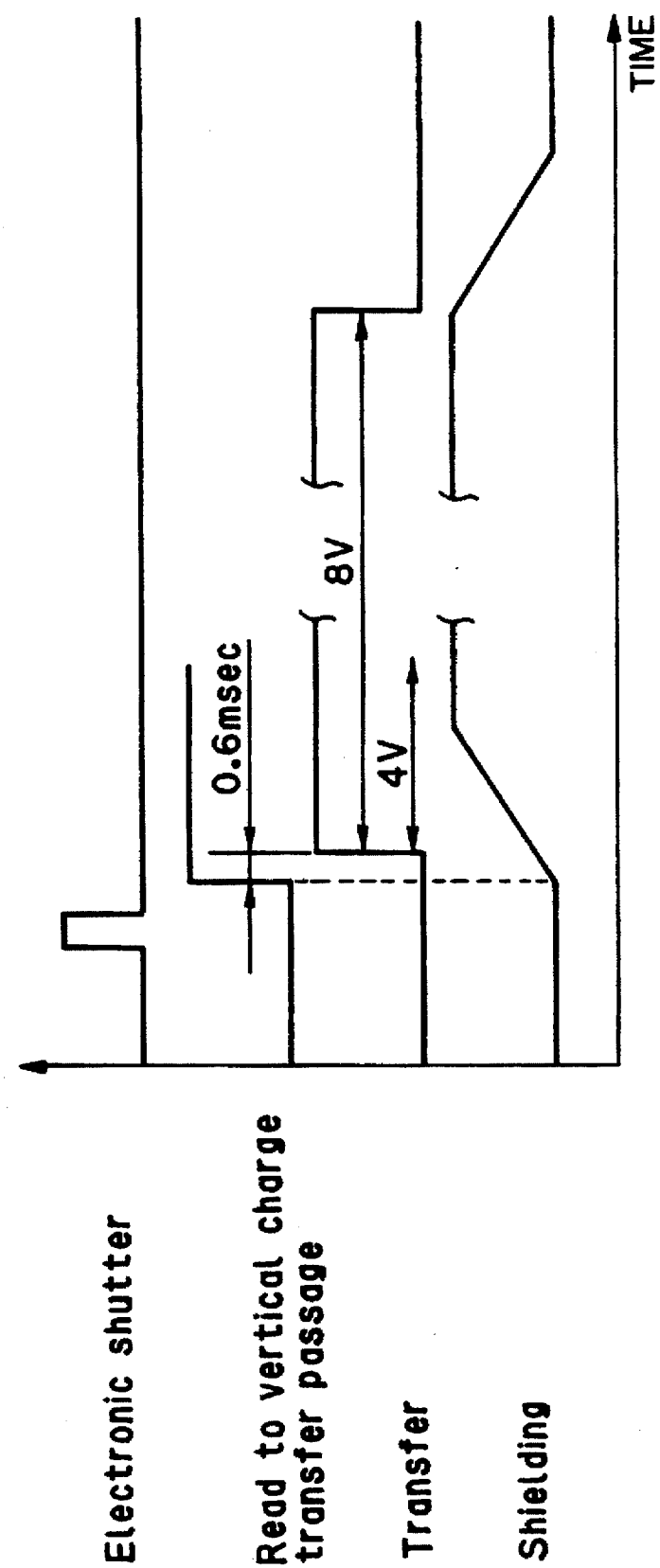
FIG. 5 is a time sequence diagram showing operation of the embodiment.

Next, the electronic shutter operation and operation of the shield plate 14 will be described with reference to FIG. 5. When the electronic shutter operation is performed (FIG. 5(a)), an electrical charge is formed in the photodiode P of the CCD 10, the trigger gate G is opened after the lapse of a preset electronic shutter time, and the generated charge is read to the vertical charge transfer passage $T_v$ (FIG. 5(b)). Then, the individual charges are transferred by the domino method to the horizontal charge transfer passage in order from the charge in the first line. As shown in FIG. 5(c), transfer of all of the charges to the horizontal charge transfer passage requires a period of 8 V (1 V is 1 vertical scanning period: 16 msec).

Figure 6:
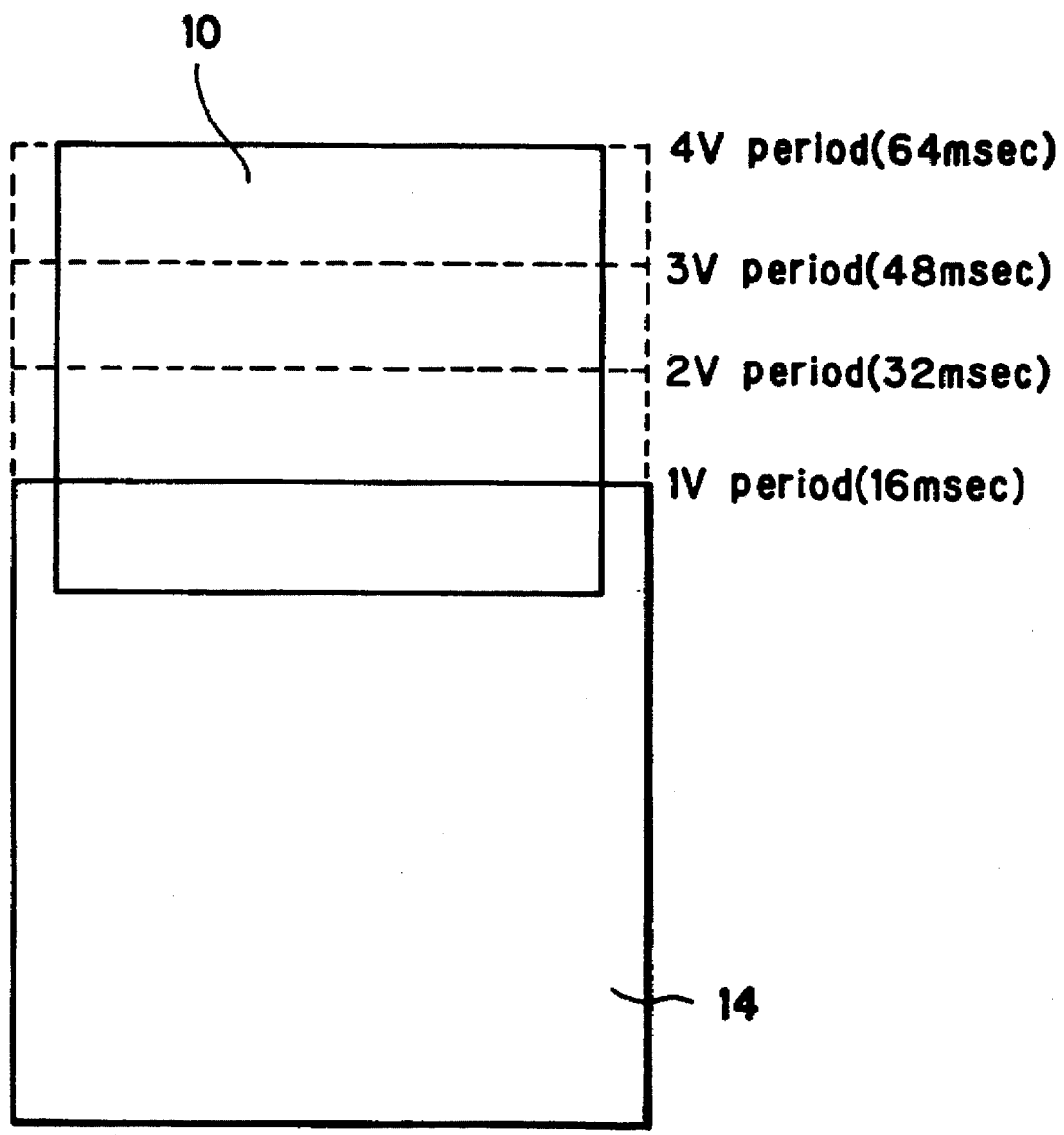
FIG. 6 is a schematic view for explaining the shielding condition by the shield plate.

The motor 17 operates from the time when the trigger gate TG is opened and, from this point in time, the shield plate 14 enters into the optical path. In this case, the shield plate 14 moves from the lower side to the upper side to block the incidence of light to the CCD 10, from the horizontal charge transfer passage side, that is, successively from the first line of the CCD 10. The entire surface of the CCD 10 is shielded from light in 4 V period (FIG. 5(d)). FIG. 6 shows the relationship between the light shielding condition by the shield plate 14 and time.

Charge in the first line and close to the first line is transferred to the horizontal charge transfer passage $T_H$ before light shielding by the shield plate 14. However, this charge is almost unaffected by adverse effects due to incident light and dark current since the time of exposure to the incident light is very short.

Since charges of lines other than the first line and close to the first line are read by the domino method and held once, they are shielded by the shield plate 14 before transfer. Therefore, there is no light incidence during the charge transfer. As a result, the charges are not subjected to the adverse effects of incident light and dark current, and the image quality is improved.

Further, since the shield plate 14 may be closed in a relatively long (4 V) period of time, the shield plate can have a simple structure.

Figure 7:
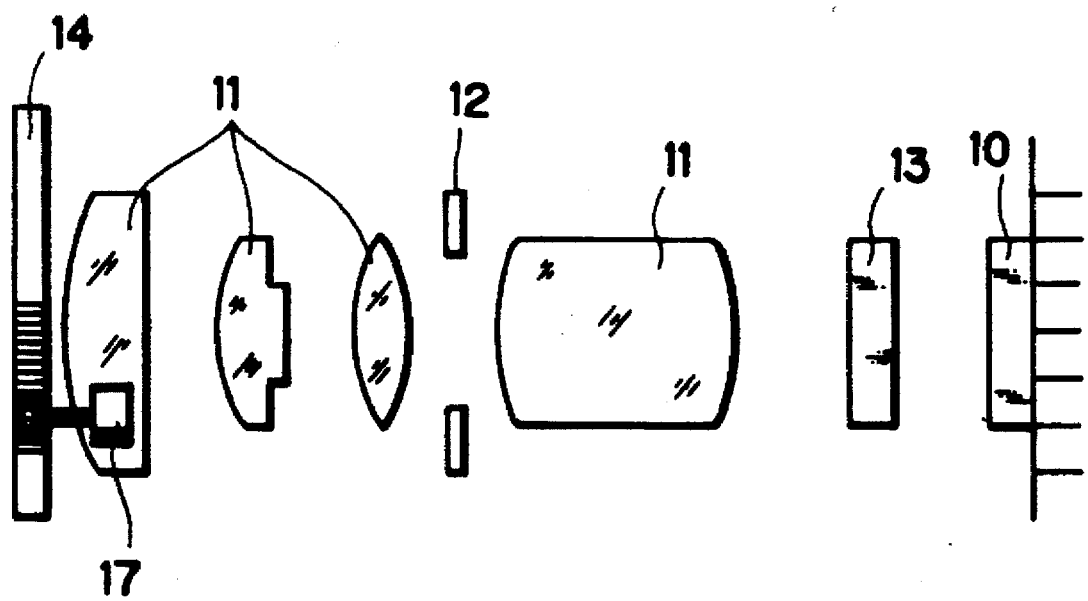
FIG. 7 is a schematic view showing the construction of a second embodiment of the present invention.

FIG. 7 shows a second embodiment of the present invention. This embodiment uses a shield plate 14 disposed at the front part of the lens away from the iris 12 of the lens system 11, and the motor 17 is operated at the timing shown in FIG. 5 to enter the shield plate 14 into the optical path. In this case, the shield plate 14 moves from the upper side to the lower side and, on the surface of the CCD 10, light is blocked successively from the lower side. Therefore, the same effect as with the first embodiment can be obtained Further, when the second embodiment is applied to an interchangeable lens type camera, the shield plate 14 and the like may be incorporated in the interchangeable lens.

Figure 8:
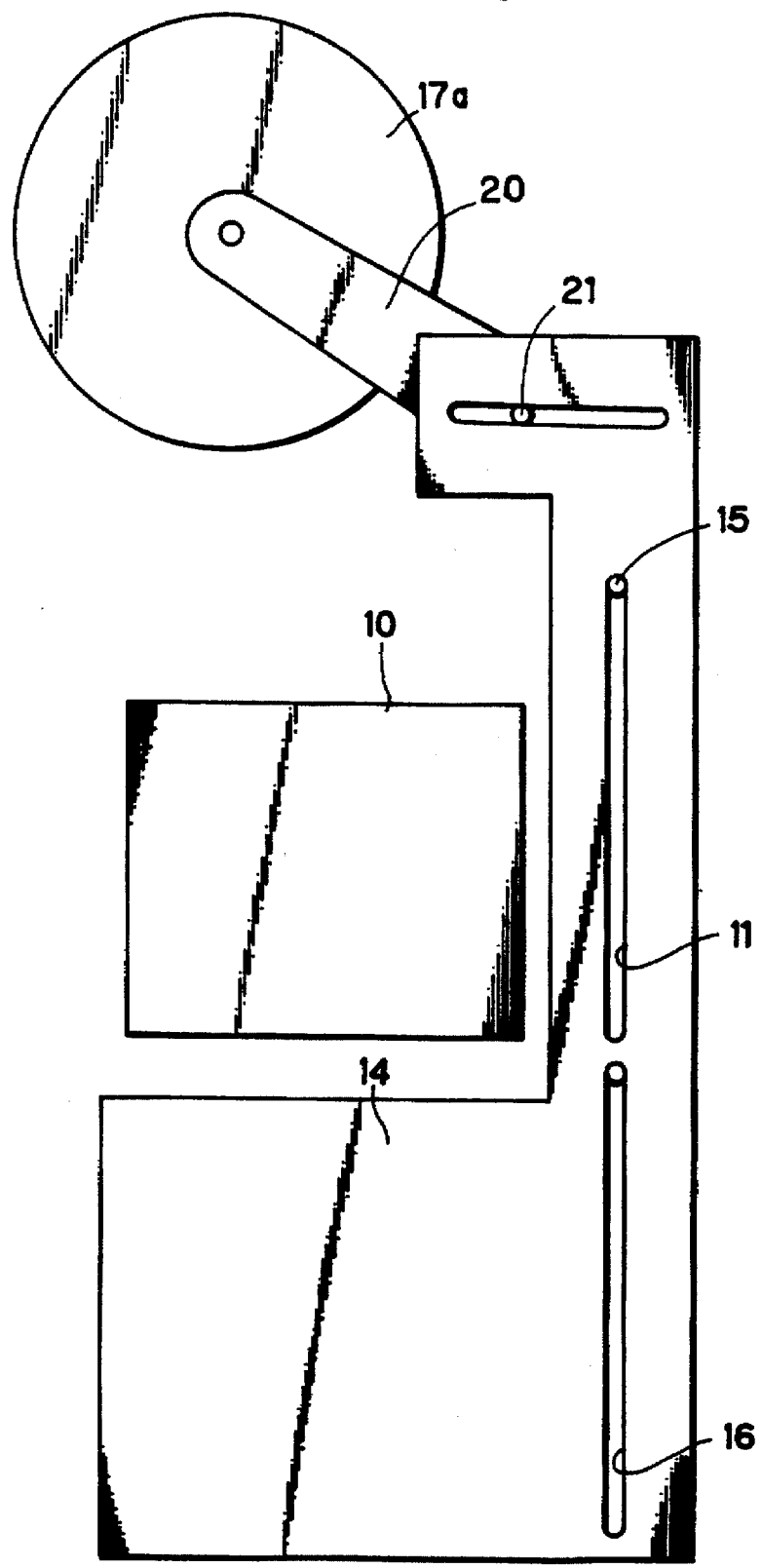
FIG. 8 is a schematic view showing the construction of a third embodiment of the present invention.

FIG. 8 shows a third embodiment of the present invention. This embodiment uses a motor 17a as a drive source, which operates under the same principles as a galvanometer (rotates by a constant angle). The rotational force of the motor 17a is transmitted to the shield plate 14 through an arm 20 and an arm-cooperative pin 21 to vertically moved the shield plate 14. Construction and operation of other parts are similar to those of the first embodiment.

Figure 9A:
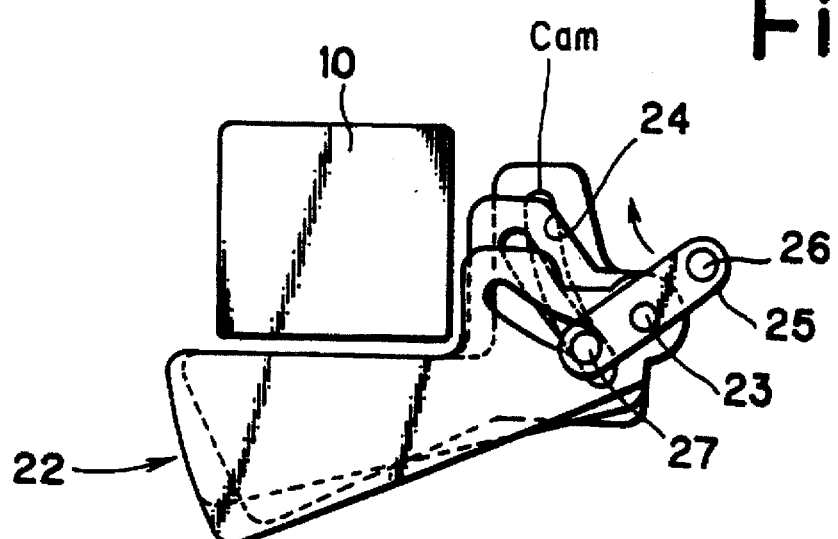
FIG. 9 is a schematic view for explaining the construction and operation condition of a modification of the shield plate.
Figure 9B:
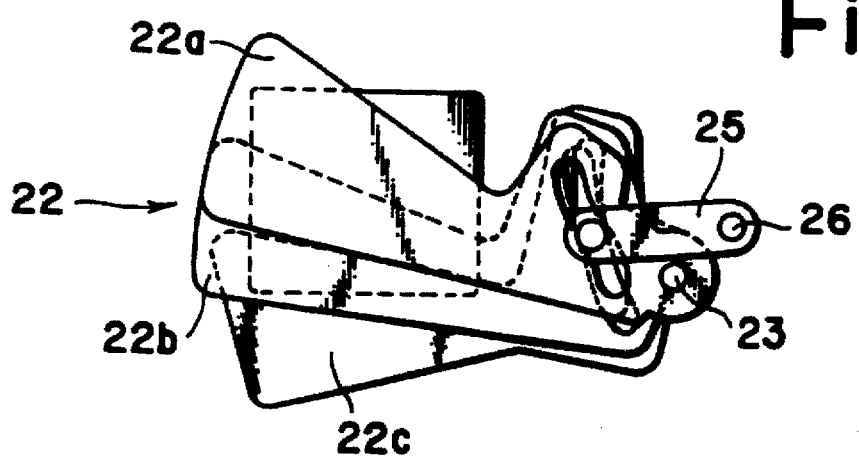
Figure 9C:
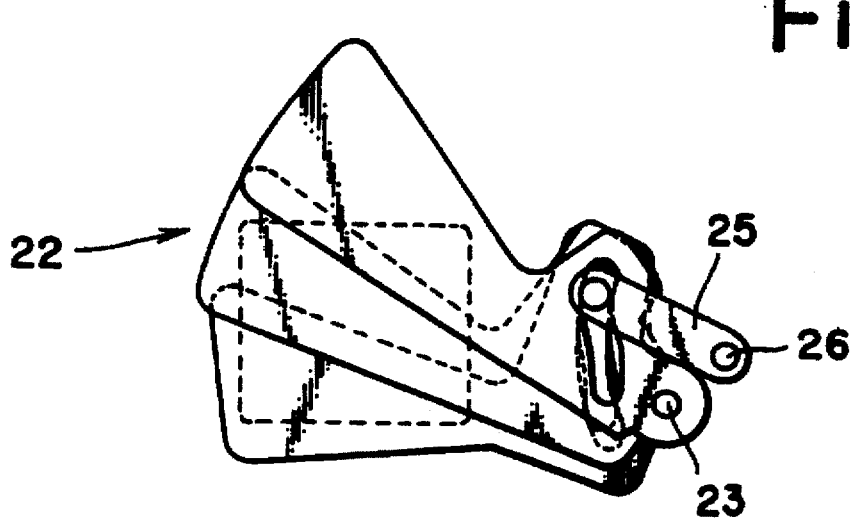
Figure 10:
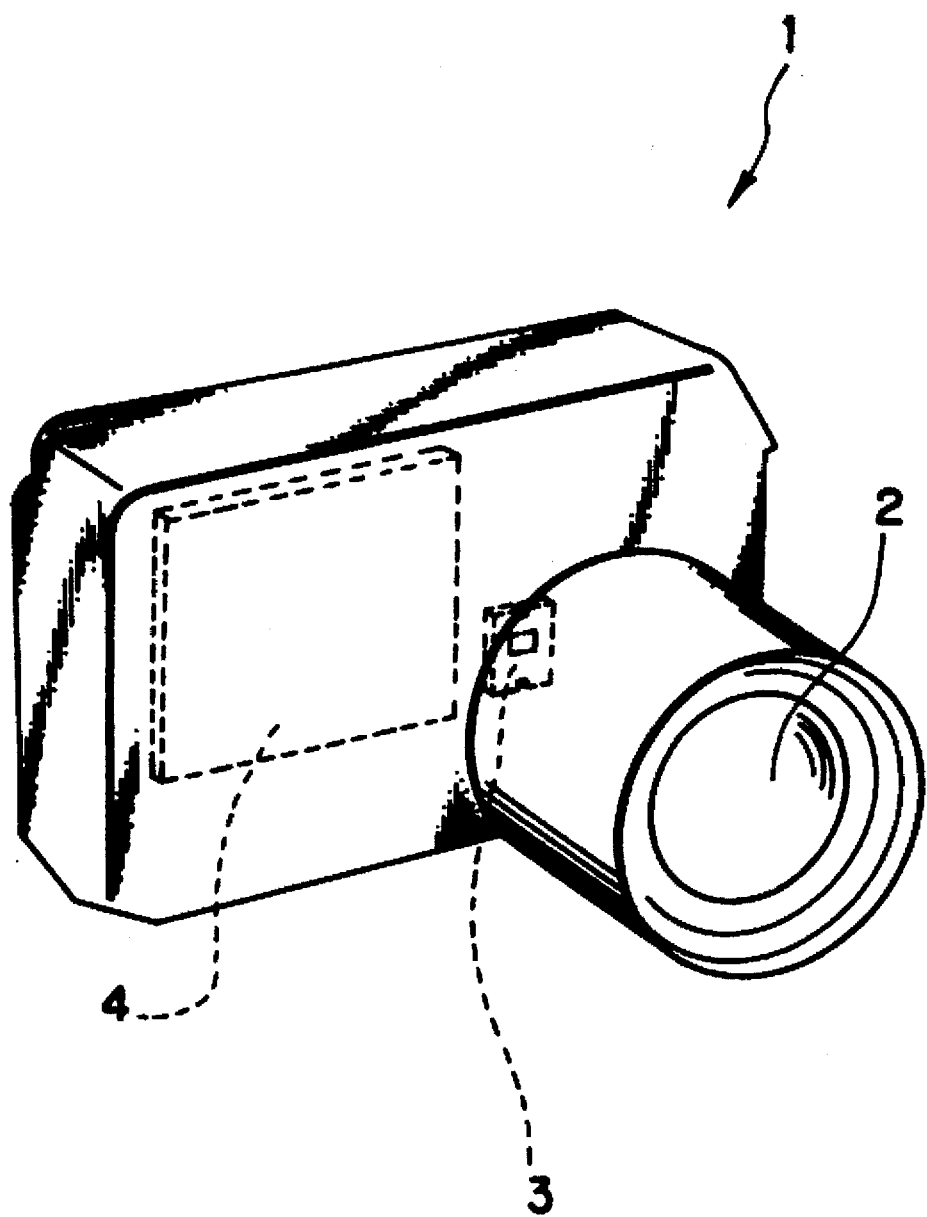
FIG. 10 is a schematic perspective view showing an electronic still camera.

FIG. 9 shows another example of shield plate. This shield plate 22 includes three blades 22a, 22b, and 22c which are rotatably supported in a fan-like form by a pin 23, and the individual blades 22a, 22b, and 22c are provided with a cam groove 24. An arm 25 is rotatably supported by a pin 26, and a cam follower 27 provided at the tip of the arm engages the cam groove 24. Therefore, when the arm 25 is rotated to move the cam follower 27 in the cam groove 24, the blades 22a, 22b, and 22c are opened, and the incidence of light to the CCD 10 is blocked by the shield plate 22.

As described above in detail with reference to the embodiment, with the present invention, the incidence of light to the solid state image pickup device for charge transfer by the domino read method is blocked from the horizontal charge transfer passage side, since most of the charges are not incident during charge transfer, and charges of the lines close to the horizontal charge transfer passage receive reduced amounts of incident light, so that deterioration of image quality due to smear and dark current is eliminated and the image quality is improved.

Further, since the shield plate is entered from the horizontal charge transfer passage side, no deterioration of image quality occurs even if the time to the completion of shielding is long (e.g. 4 V period). Therefore, the moving speed of the shield plate may be low, and the mechanism for driving the shield plate can be simplified.

What is claimed is:

1. An image pickup device shielding apparatus for an electronic still camera in which an optical image formed by a lens system is incident to a solid state image pickup device, the solid state image pickup device is operated by an electronic shutter, and a generated electrical charge is transferred in the solid state image pickup device by a domino read method, said shielding apparatus comprising:

a shield plate disposed in a vicinity of a front face of the solid state image pickup device for entering into an optical path from a horizontal charge transfer passage side of the solid state image pickup device, said shield plate entering the optical path during transfer of said generated electrical charge; and a drive mechanism for driving said shield plate into the optical path after an electronic shutter operation.

2. An image pickup device shielding apparatus for an electronic still camera in which an optical image formed by a lens system is incident to a solid state image pickup device, the solid state image pickup device is operated by an electronic shutter, and a generated electrical charge is transferred in the solid state image pickup device by a domino read method, said shielding apparatus comprising:

a shield plate disposed in the lens system for entering into an optical path from a side opposite a horizontal charge transfer passage side of the solid state image pickup device; and a drive mechanism for driving said shield plate into the optical path after an electronic shutter operation.

3. A shielding apparatus as recited in claim 2, further comprising a guide pin for guiding movement of said shield plate, said shield plate comprising a guide groove in which said guide pin is inserted and further comprising a rack, said drive mechanism comprising a rotatably driven pinion which engages said rack for driving said shield plate into the optical path.

4. A shielding apparatus as recited in claim 2, further comprising a shield pin for guiding movement of said shield plate, said shield plate comprising a guide groove in which said guide pin is inserted and further comprising an additional groove, said drive mechanism comprising a rotatably driven arm and a pin disposed on said arm, said pin engaging the additional groove for driving said shield plate into the optical path.

5. A shielding apparatus as recited in claim 2, wherein said guide plate comprises a plurality of rotatably supported blades, each of said blades being provided with a cam groove, said drive mechanism comprising a rotatably driven arm and a cam follower provided on said arm, said cam follower engaging said cam groove in each of said blades for driving said blades in fan-like form into the optical path.

6. The shielding apparatus as recited in claim 2, wherein the shield plate enters the optical path during transfer of said generated electrical charge.

7. An image pickup device shielding apparatus for an electronic still camera in which an optical image formed by a lens system is incident to a solid state image pickup device, the solid state image pickup device is operated by an electronic shutter, and a generated electrical charge is transferred in the solid state image pickup device by a domino read method, said shielding apparatus comprising:

a shield plate disposed in a vicinity of a front face of the solid state image pickup device for entering into an optical path from a horizontal charge transfer passage side of the solid state image pickup device;

a drive mechanism for driving said shield plate into the optical path after an electronic shutter operation; and a guide pin for guiding movement of said shield plate, said shield plate comprising a guide groove in which said guide pin is inserted and further comprising a rack, said drive mechanism comprising a rotatably driven pinion which engages said rack for driving said shield plate into the optical path.

8. An image pickup device shielding apparatus for an electronic still camera in which an optical image formed by a lens system is incident to a solid state image pickup device, the solid state image pickup device is operated by an electronic shutter, and a generated electrical charge is transferred in the solid state image pickup device by a domino read method, said shielding apparatus comprising:

a shield plate disposed in a vicinity of a front face of the solid state image pickup device for entering into an optical path from a horizontal charge transfer passage side of the solid state image pickup device;

a drive mechanism for driving said shield plate into the optical path after an electronic shutter operation; and a guide pin for guiding movement of said shield plate, said shield plate comprising a guide groove in which said guide pin is inserted and further comprising an additional groove, said drive mechanism comprising a rotatably driven arm and a pin disposed on said arm, said pin engaging the additional groove for driving said shield plate into the optical path.

9. An image pickup device shielding apparatus for an electronic still camera in which an optical image formed by a lens system is incident to a solid state image pickup device, the solid state image pickup device is operated by an electronic shutter, and a generated electrical charge is transferred in the solid state image pickup device by a domino read method, said shielding apparatus comprising:

a shield plate disposed in a vicinity of a front face of the solid state image pickup device for entering into an optical path from a horizontal charge transfer passage side of the solid state image pickup device; and a drive mechanism for driving said shield plate into the optical path after an electronic shutter operation, wherein said shield plate comprises a plurality of rotatably supported blades, each of said blades being provided with a cam groove, said drive mechanism comprising a rotatably driven arm and a cam follower provided on said arm, said cam follower engaging said cam groove in each of said blades for driving said blades in fan-like form into the optical path.

* * * * *